(12) United States Patent
Wang et al.

(10) Patent No.: US 12,248,414 B2
(45) Date of Patent: Mar. 11, 2025

(54) DATA TRANSMISSION CONTROL DEVICE

(71) Applicant: Sigmastar Technology Ltd., Xiamen (CN)

(72) Inventors: Yan-Qing Wang, Xiamen (CN); Yan-Xiong Wu, Xiamen (CN); Wei-Sheng Du, Xiamen (CN); Qin-Wei She, Xiamen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 17 days.

(21) Appl. No.: 18/122,917

(22) Filed: Mar. 17, 2023

(65) Prior Publication Data
US 2023/0325330 A1    Oct. 12, 2023

(30) Foreign Application Priority Data

Apr. 6, 2022    (CN) .......................... 202210359819.1

(51) Int. Cl.
*G06F 13/24*    (2006.01)
*G06F 13/42*    (2006.01)

(52) U.S. Cl.
CPC .......... *G06F 13/24* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 10,318,334 B2* | 6/2019 | Floris van Beek van Leeuwen ... | G06F 13/28 |
| 2020/0356503 A1* | 11/2020 | Zang ....................... | G06F 13/24 |
| 2021/0232515 A1* | 7/2021 | Govindarajan ......... | G06F 13/20 |

\* cited by examiner

*Primary Examiner* — Farley Abad
*Assistant Examiner* — Dayton Lewis-Taylor
(74) *Attorney, Agent, or Firm* — WPAT, PC

(57) ABSTRACT

A data transmission control device is provided. The data transmission control device is disposed in a chip that includes a Peripheral Component Interconnect Express (PCIe) interface, and the data transmission control device is coupled to a memory that includes a block. The data transmission control device includes: a control circuit, a PCIe interface controller, and an address monitoring circuit. The PCIe interface controller is configured to receive a data. The address monitoring circuit is configured to issue an interrupt to the control circuit when the data is written to the block.

4 Claims, 8 Drawing Sheets

DATA TRANSMISSION CONTROL DEVICE

BACKGROUND OF THE INVENTION

1. Field of the Invention

The present invention generally relates to chips, and, more particularly, to chips that can be cascaded through the Peripheral Component Interconnect Express (PCI-Express, hereinafter referred to as PCIe) interface and to the data transmission control device of the chips.

2. Description of Related Art

FIG. 1 shows a schematic diagram of multiple chips in the prior art that are cascaded through the PCIe interface. The chip 102 is connected to the chip 104, the chip 106, and the chip 108 through the PCIe switch 110. Cascading multiple chips can improve their overall performance. If only two chips are cascaded (e.g., the chip 102 and the chip 104), the PCIe switch 110 is not needed.

When multiple chips are cascaded, one chip operates in the Root Complex (RC) mode (for example, the chip 102, hereinafter referred to as the RC side), and the other chips operate in the Endpoint (EP) mode (for example, the chips 104, 106 and 108, hereinafter referred to as the EP sides). The virtqueue-based Remote Processor Messaging (RPMsg) communication between the RC side and the EP side is implemented through the PCIe bus.

In the virtqueue-based RPMsg communication, the RC side notifies, by writing a specific content in the specific memory address on the EP side, the EP side that there is/are data to be read or available buffer(s) in the virtqueue, and the control circuit on the EP side (e.g., a central processing unit, microprocessor, microcontroller, microprocessor unit, digital signal processor (DSP) or the like with program execution capabilities) determines, by means of polling, whether the specific content has been written into the specific memory address. However, because polling is not responsive enough, there is an issue of communication delay between the RC side and the EP side.

Furthermore, as the memory shared by the RC side and the EP side is provided by the RC side, the RC side must provide a larger shared memory when connected to multiple EP sides at the same time (as in the example of FIG. 1), which increases the cost of the RC side.

SUMMARY OF THE INVENTION

In view of the issues of the prior art, an object of the present invention is to provide chips and data transmission control devices that can transmit and receive data through the PCIe interface, so as to make an improvement to the prior art.

According to one aspect of the present invention, a data transmission control device is provided. The data transmission control device is disposed in a chip that includes a Peripheral Component Interconnect Express (PCIe) interface and coupled to a memory that includes a block. The data transmission control device includes a control circuit, a PCIe interface controller, and an address monitoring circuit. The PCIe interface controller is configured to receive a data. The address monitoring circuit is configured to issue an interrupt to the control circuit in response to the data being written into the block.

According to another aspect of the present invention, a data transmission control device is provided. The data transmission control device is disposed in a chip that includes a PCIe interface and coupled to a memory. The data transmission control device includes a PCIe interface controller and a control circuit. The PCIe interface controller is configured to receive a first data from a target chip, write the first data into the memory, receive a second data that has a target address, and write the second data into the memory according to the target address. The control circuit is configured to read the first data from the memory after the second data is written into the memory. The chip operates in an Endpoint (EP) mode, and the target chip operates in a Root Complex (RC) mode. The first data is written into the memory before the second data is written into the memory.

According to still another aspect of the present invention, a data transmission control device is provided. The data transmission control device is disposed in a chip that includes a PCIe interface and coupled to a memory. The data transmission control device includes a PCIe interface controller and a control circuit. The control circuit is configured to control the PCIe interface controller to communicate with a target chip based on a Virtio. The chip operates in an Endpoint (EP) mode, and the target chip operates in a Root Complex (RC) mode. The memory stores a virtqueue data of the Virtio.

The technical means embodied in the embodiments of the present invention can solve at least one of the problems of the prior art. Therefore, the present invention can save cost and/or reduce communication delay compared with the prior art.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes chips that can transmit and receive data through the PCIe interface and the data transmission control device of the chips. On account of that some or all elements of the data transmission control device could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

Figure 1:
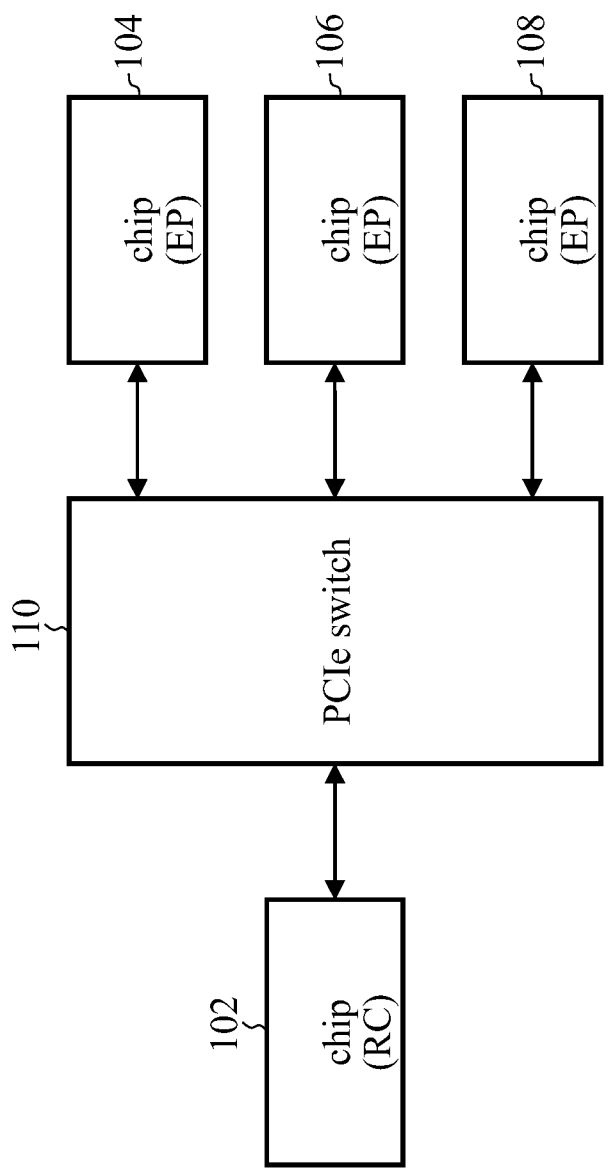
FIG. 1 shows a schematic diagram of multiple chips that are cascaded through the PCIe interface in the prior art.
Figure 2:
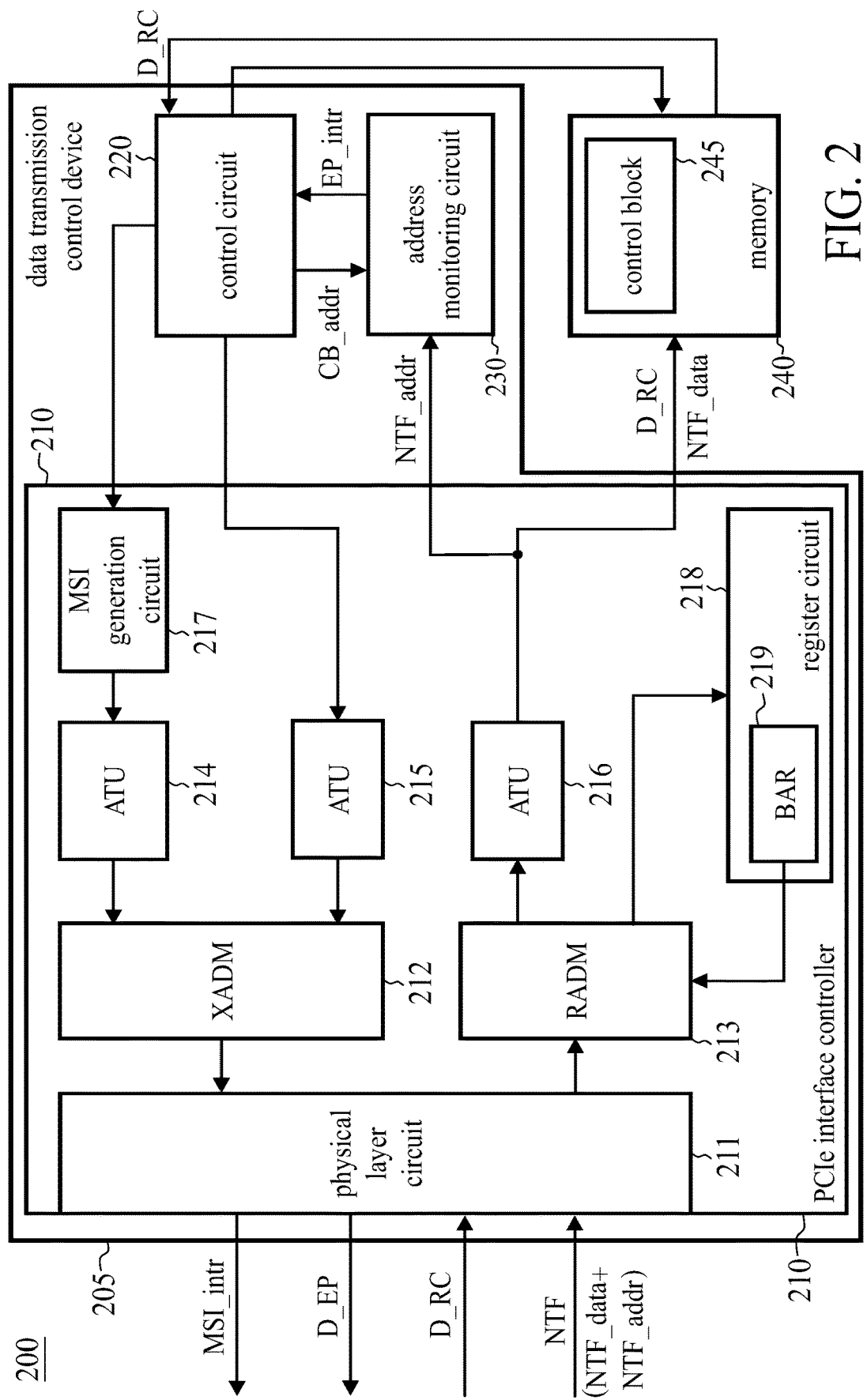
FIG. 2 is a functional block diagram of a chip according to an embodiment of the present invention.

FIG. 2 is a functional block diagram of a chip according to an embodiment of the present invention. The chip 200 includes a data transmission control device 205 and a memory 240. The data transmission control device 205 includes a PCIe interface controller 210, a control circuit 220, and an address monitoring circuit 230. The memory 240 includes a control block 245 which is arranged at a predetermined address CB_addr of the memory 240. The chip 200 transmits and/or receives data through the PCIe interface controller 210. In some embodiments, the memory 240 is in another chip, not in the chip 200.

In some embodiments, when the chip 200 is connected to a target chip (not shown) through the PCIe interface controller 210 and the PCIe bus, the chip 200 operates in the EP mode (i.e., the chip 200 is the EP side), the target chip operates in the RC mode (i.e., the target chip is the RC side), and the target chip provides the shared memory that is necessary for PCIe-based cascading.

The PCIe interface controller 210 includes a physical layer circuit 211, a transmit application dependent module (XADM) 212, a receive application dependent module (RADM) 213, an address translation unit (ATU) 214, an ATU 215, an ATU 216, a message signaled interrupt (MSI) generation circuit 217, and a register circuit 218. The register circuit 218 includes a base address register (BAR) 219 and multiple registers.

The ATU 214 and the ATU 215 map the addresses of the control circuit 220 domain to the bus addresses of the PCIe domain, and the ATU 216 maps the bus addresses of the PCIe domain to the addresses of the control circuit 220 domain. The addresses of the control circuit 220 domain correspond to specific addresses in the memory 240. The control circuit 220 writes data into the shared memory (equivalent to transmitting data to the target chip) and reads data from the shared memory (equivalent to receiving data from the target chip) through the ATU 214, the ATU 215, and the ATU 216.

When the chip 200 transmits the EP-side data D_EP to the target chip, the EP-side data D_EP is packaged by the XADM 212 (including but not limited to adding a header to the data) into a data in the transaction layer packet (TLP) format before transmitted to the target chip through the physical layer circuit 211 and the PCIe bus. After transmitting the EP-side data D_EP (i.e., after the EP-side data D_EP is written into the shared memory), the control circuit 220 controls the MSI generation circuit 217 to send a message signaled interrupt MSI_intr to the target chip through the ATU 214, the XADM 212, and the physical layer circuit 211 to notify the target chip that the EP-side data D_EP can be received (i.e., data can be read from the shared memory). The message signaled interrupt is an interrupt triggering method (often referred to as "MSI-X") provided by the PCIe standard.

When the target chip sends the RC-side data D_RC to the chip 200, the target chip first writes the RC-side data D_RC into the shared memory and then writes a notification NTF into the control block 245 through the RADM 213 and the ATU 216 to notify the chip 200 that there is data to be received (i.e., the RC-side data D_RC). The notification NTF includes the notification content NTF_data (e.g., a string "NOTIFY") and a target address NTF_addr. The notification content NTF_data will be written into the memory space corresponding to the target address NTF_addr. The ATU 216 translates the target address NTF_addr into an address corresponding to the memory 240.

After the data (the RC-side data D_RC, notification NTF, or other data) is transmitted to the PCIe interface controller 210 via the PCIe bus, the RADM 213 first unpackages the data (including but not limited to removing the header) and then, according to the type of the data (e.g., according to the content of a certain data segment), (1) writes the data into the memory 240 through the ATU 216 so that the control circuit 220 can read the data; (2) determines whether to write the data into the control block 245 according to the content of the BAR 219; or (3) modifies the contents of the register circuit 218. For the RC-side data D_RC, the RADM 213 performs the operation (1). For the notification NTF, the RADM 213 performs the operation (2) (which will be discussed in detail in the next paragraph). For other data (e.g., commands to modify the register circuit 218), the RADM 213 performs the operation (3).

For the notification NTF, since the target address NTF_addr falls within the address range recorded in the BAR 219, the RADM 213 transmits the notification NTF to the ATU 216. After the ATU 216 translates the target address NTF_addr, the notification content NTF_data is written into the memory 240 (more specifically, into the control block 245). The address monitoring circuit 230 determines whether the chip 200 has received the notification NTF by monitoring whether data has written into the control block 245. In some embodiments (for illustrative purposes only, not for limiting the scope of the present invention), the address monitoring circuit 230 determines whether the chip 200 has received the notification NTF by comparing the target address NTF_addr and the address of the control block 245. If the target address NTF_addr is identical to the address of the control block 245, the address monitoring circuit 230 issues an interrupt EP_intr to the control circuit 220. In response to the reception of the interrupt EP_intr, the control circuit 220 reads the RC-side data D_RC from the shared memory in the target chip (i.e., equivalent to receiving the RC-side data D_RC) through the ATU 215, the XADM 212, and the physical layer circuit 211.

The operating principles of the XADM 212, the RADM 213, the ATU 214, the ATU 215, the ATU 216, and the MSI generation circuit 217 are well known to people having ordinary skill in the art and thus omitted herein for brevity.

Figure 3:
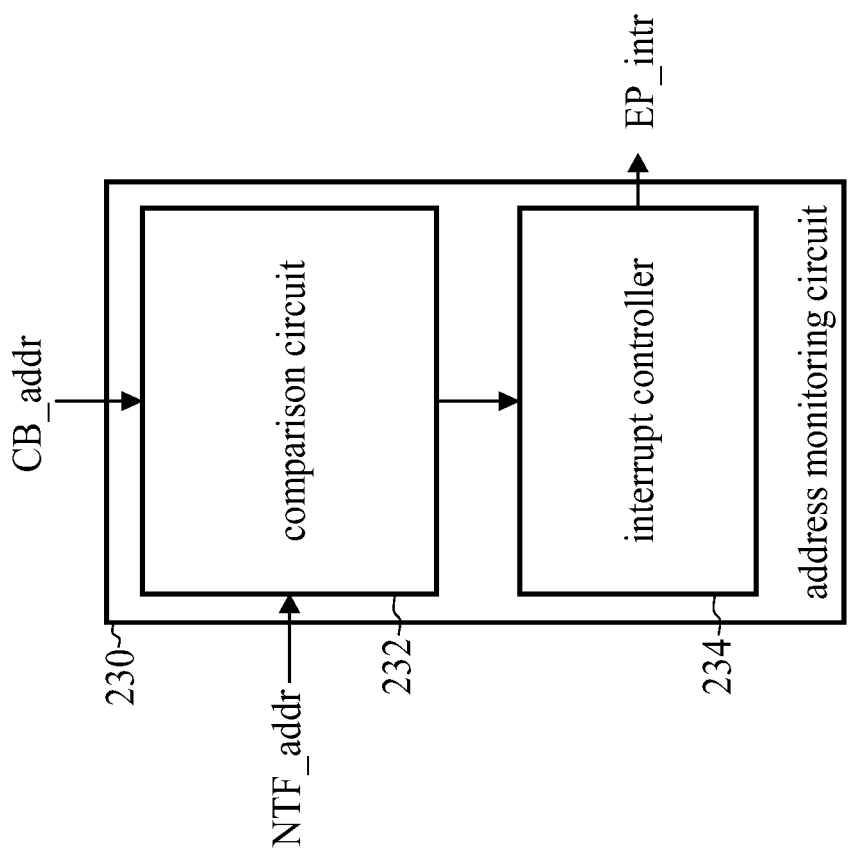
FIG. 3 is a functional block diagram of an address monitoring circuit according to an embodiment of the present invention.

FIG. 3 is a functional block diagram of the address monitoring circuit 230 according to an embodiment of the present invention. The address monitoring circuit 230 includes a comparison circuit 232 and an interrupt controller 234. The comparison circuit 232 compares the target address NTF_addr with the predetermined address CB_addr of the control block 245 (which may be provided by the control circuit 220). When the target address NTF_addr is identical to the predetermined address CB_addr, the comparison circuit 232 controls the interrupt controller 234 to issue the interrupt EP_intr. The implementation details of the comparison circuit 232 and the interrupt controller 234 are well known to people having ordinary skill in the art and thus omitted for brevity.

In summary, by using the address monitoring circuit 230 to monitor whether data has been written into the control block 245, the chip 200 determines whether the chip 200 has received the notification NTF. In other words, the control circuit 220 can know in real time that the chip 200 has received the notification NTF. In comparison with the polling approach in the prior art, the chip 200 is more responsive, which can reduce the communication delay.

Figure 4:
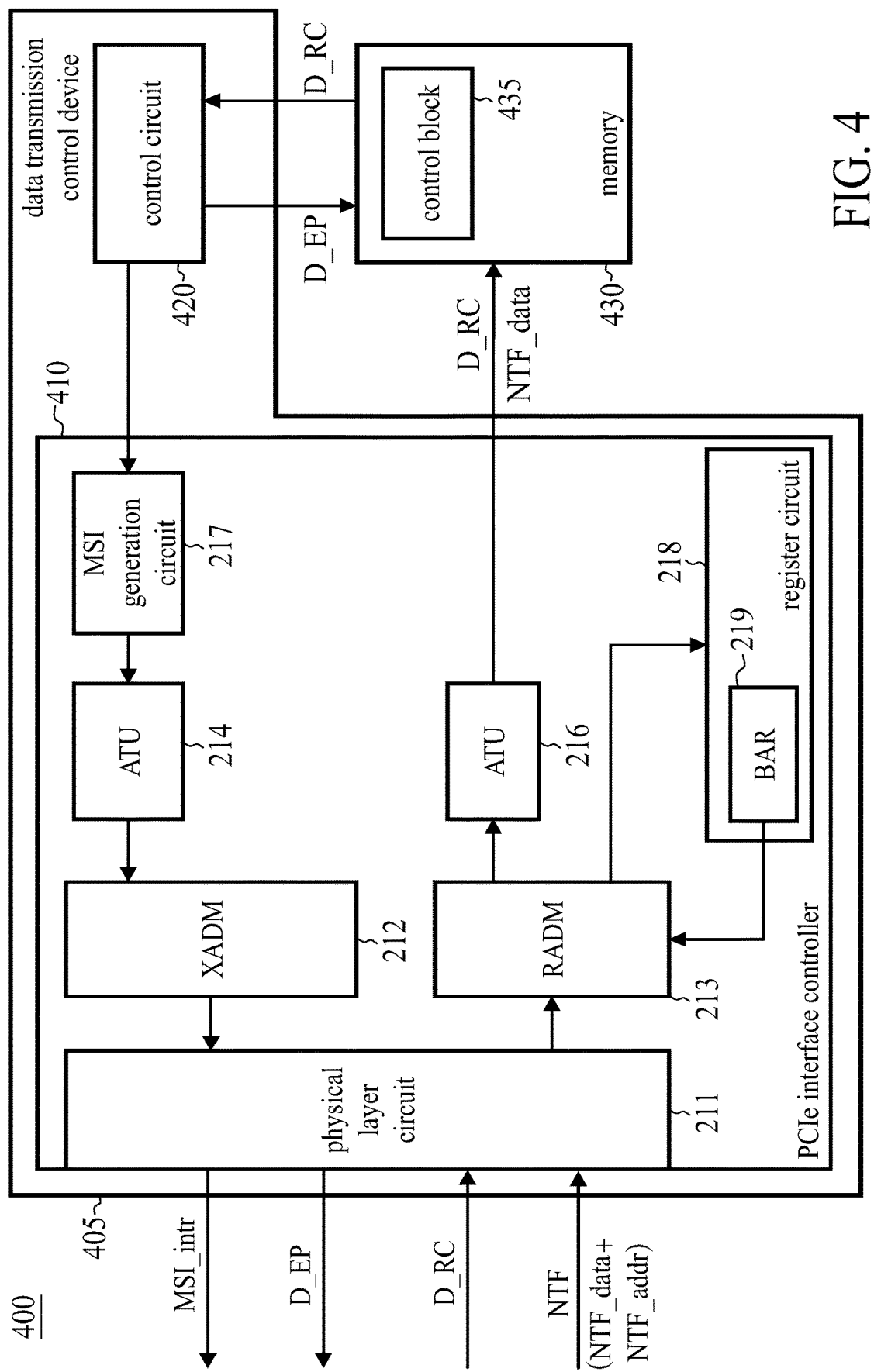
FIG. 4 shows a functional block diagram of a chip according to another embodiment of the present invention.
Figure 5:
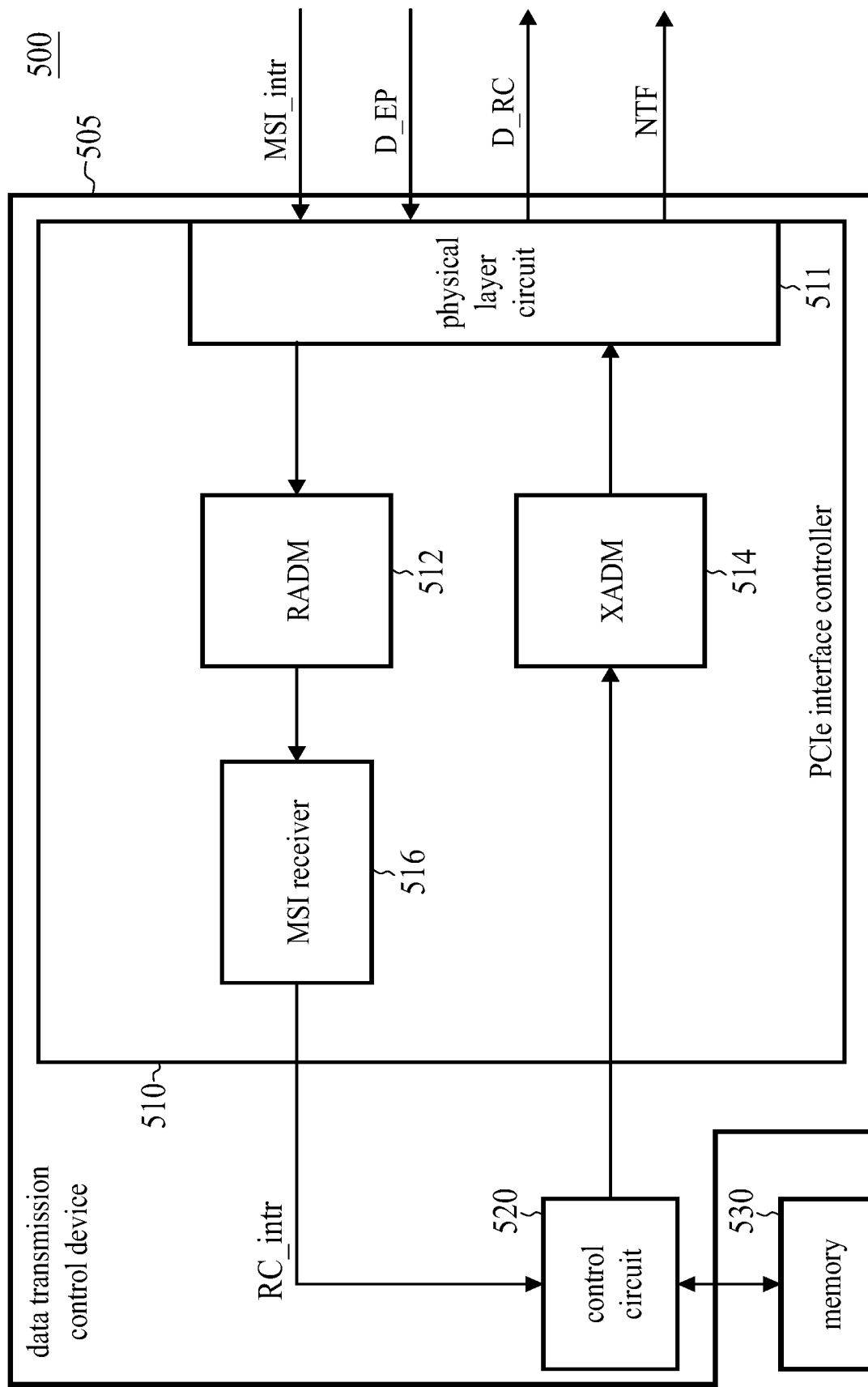
FIG. 5 shows a functional block diagram of a chip according to yet another embodiment of the present invention.

FIG. 4 shows a functional block diagram of the chip according to another embodiment of the present invention, and FIG. 5 shows the functional block diagram of a chip according to yet another embodiment of the present invention. The chip 400 of FIG. 4 and the chip 500 of FIG. 5 can be connected to each other and transmit data to each other through the PCIe interface. In other words, in the following discussion, the chip 400 and the chip 500 are each other's target chip.

In reference to FIG. 4, the chip 400 includes a data transmission control device 405 and a memory 430. The data transmission control device 405 includes a PCIe interface controller 410 and a control circuit 420. The memory 430 includes control block 435. The control circuit 420 can access the memory 430 and may send the message signaled interrupt MSI_intr through the PCIe interface controller 410 to the target chip. The PCIe interface controller 410 is similar to the PCIe interface controller 210, except that the PCIe interface controller 410 does not include the ATU 215; therefore, the cost of the PCIe interface controller 410 is lower than that of the PCIe interface controller 210. In some embodiments, the memory 430 is external to the chip 400, that is, the memory 430 is not included in the chip 400.

In reference to FIG. 5, the chip 500 includes a data transmission control device 505 and a memory 530. The data transmission control device 505 includes a PCIe interface controller 510 and a control circuit 520. The PCIe interface controller 510 includes a physical layer circuit 511, a RADM 512, an XADM 514, and an MSI receiver 516. The functions of the RADM 512 and the XADM 514 are the same or similar to those of the RADM 213 and the XADM 212, respectively, and are thus omitted for brevity. The MSI receiver 516 sends an interrupt RC_intr to the control circuit 520 in response to the reception of the message signaled interrupt MSI_intr from the target chip. The MSI receiver 516 is well known to people having ordinary skill in the art, and the details are thus omitted for brevity.

In some embodiments (for illustrative purposes only, not for limiting the scope of the present invention), when the chip 400 and the chip 500 are connected through the PCIe bus, the chip 400 operates in the EP mode while the chip 500 operates in the RC mode, and the shared memory is provided by the chip 400 (i.e., the memory 430 functions as the shared memory for the chip 400 and the chip 500). When the chip 400 and the chip 500 operate in a Virtio through the PCIe bus, the control circuit 420 and the control circuit 520 respectively control the PCIe interface controller 410 and the PCIe interface controller 510 to enable the communication between the chip 400 and the chip 500 based on the Virtio, and the memory 430 functions as the shared memory that stores the information of the virtqueue.

Figure 6:
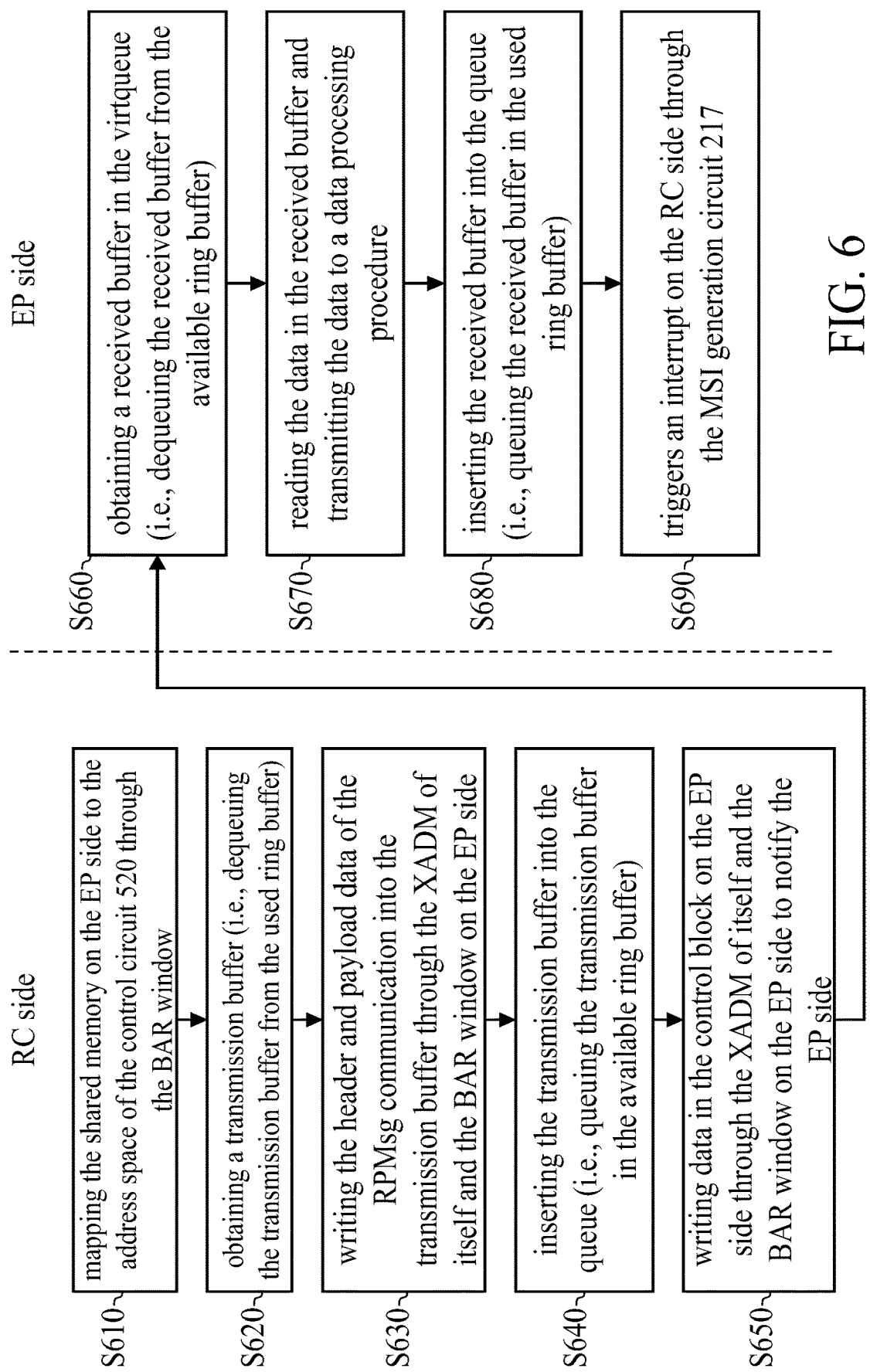
FIG. 6 shows the flowchart of the RC side transmitting data to the EP side.
Figure 7:
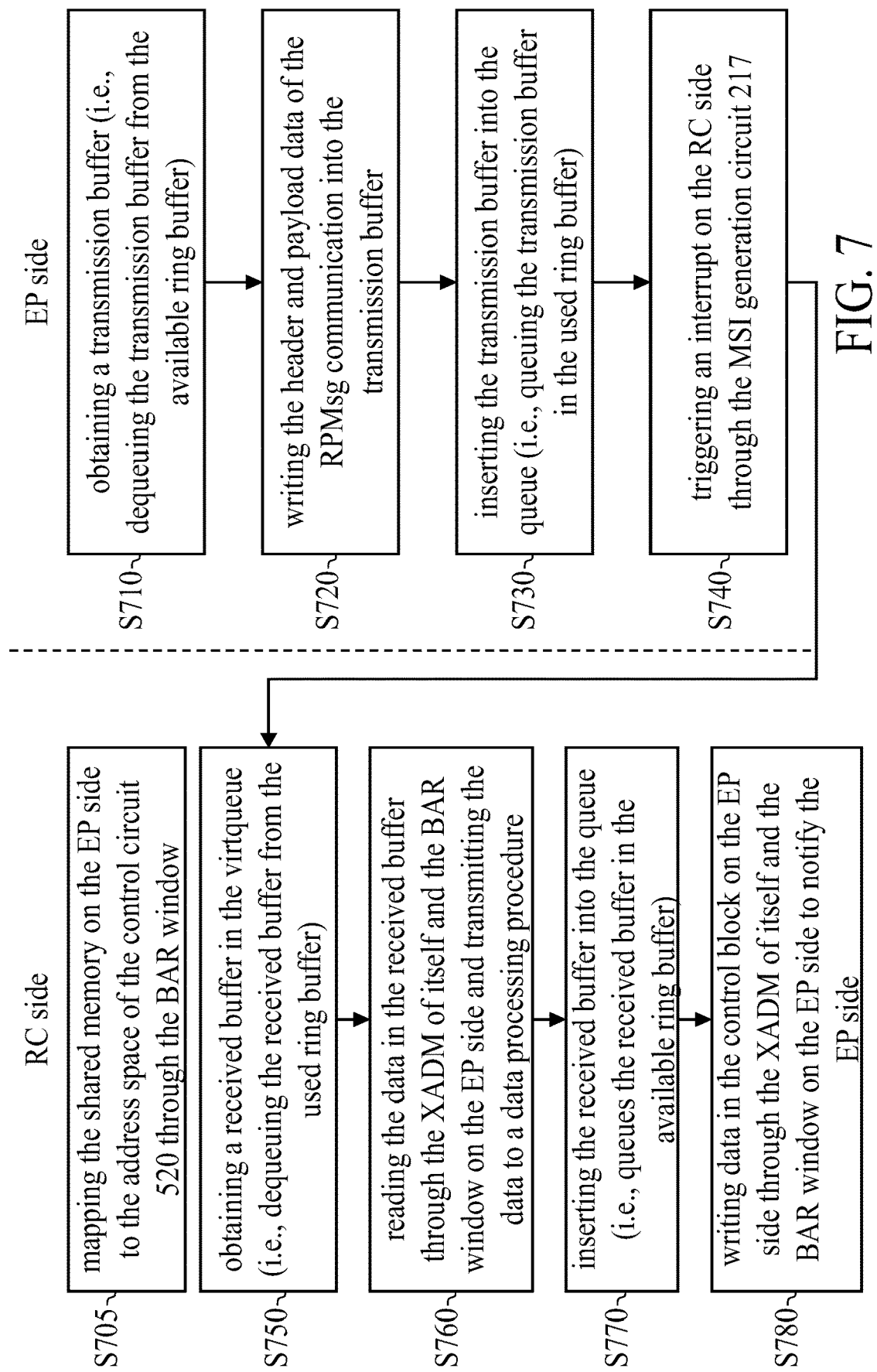
FIG. 7 shows the flowchart of the EP side transmitting data to the RC side.

FIGS. 6 and 7 are flowcharts of implementing the virtqueue-based RPMsg communication between the EP side (e.g., the chip 400) and the RC side (e.g., the chip 500) through the PCIe bus according to an embodiment of the present invention. FIG. 6 shows the flowchart of the RC side transmitting data to the EP side, and FIG. 7 shows the flowchart of the EP side transmitting data to the RC side. The memory 430 includes multiple buffers (transmission buffer(s) and received buffer(s)) and stores the virtqueue data (including but not limited to the used ring buffer, the available ring buffer, and the descriptor table). The principles and operational details of virtqueues will not be discussed in detail below because they are well known to people having ordinary skill in the art.

Reference is made to FIGS. 4 to 6 for discussions below. The process of FIG. 6 uses the first virtqueue of the Virtio and includes the following steps.

Step S610: The chip 500 maps the shared memory (including the control block 435) of the chip 400 to the address space of the control circuit 520 through the BAR window provided by the chip 400. The BAR window is stored in the BAR 219 of the chip 400.

Step S620: Memory allocation. The control circuit 520 of the chip 500 obtains from the memory 430 a transmission buffer in the virtqueue according to the descriptor table (i.e., dequeues the transmission buffer from the used ring buffer).

Step S630: The control circuit 520 writes the header and payload data of the RPMsg communication (e.g., the RC-side data D_RC) into the transmission buffer (i.e., writing the RC-side data D_RC to the memory 430) through the XADM 514 and the BAR window of the chip 400.

Step S640: Transmitting the data. Specifically, the control circuit 520 inserts the transmission buffer into the queue (i.e., queues the transmission buffer in the available ring buffer).

Step S650: The control circuit 520 writes data in the control block 435 on the EP side through the XADM 514 and the BAR window of the chip 400 to notify the EP side that there is data to be read (e.g., the RC-side data D_RC) in the buffer.

Step S660: The EP side receives the data. The control circuit 420 obtains a received buffer in the virtqueue (i.e., dequeues the received buffer from the available ring buffer). The received buffer corresponds to the aforementioned transmission buffer.

Step S670: The control circuit 420 reads the data in the received buffer (e.g., the RC-side data D_RC) and transmits the data to a data processing procedure.

Step S680: Memory deallocation. The control circuit 420 frees the received buffer by inserting it into the queue (i.e., queues the received buffer in the used ring buffer).

Step S690: The control circuit 420 triggers the interrupt RC_intr on the RC side through the MSI generation circuit 217; that is, the chip 400 transmits the message signaled interrupt MSI_intr to the chip 500 (RC side) to notify the chip 500 that there is an available buffer in the virtqueue.

Reference is made to FIGS. 4, 5, and 7 for discussions below. The process of FIG. 7 uses the second virtqueue (which is not the first virtqueue) of the Virtio and includes the following steps.

Step S705: The chip 500 maps the shared memory (including the control block 435) of the chip 400 to the address space of the control circuit 520 through the BAR window provided by the chip 400. Step S705 is the same as or similar to step S610.

Step S710: Memory allocation. The control circuit 420 of the chip 400 obtains from the memory 430 a transmission buffer in the virtqueue according to the descriptor table (i.e., dequeues the transmission buffer from the available ring buffer).

Step S720: The control circuit 420 writes the header and payload data of the RPMsg communication (e.g., the EP-side data D_EP) into the transmission buffer (i.e., writes the EP-side data D_EP into the memory 430).

Step S730: Transmitting the data. Specifically, the control circuit 420 inserts the transmission buffer into the queue (i.e., queues the transmission buffer in the used ring buffer).

Step S740: The control circuit 420 triggers an interrupt on the RC side through the MSI generation circuit 217; that is, the chip 400 transmits the message signaled interrupt MSI_intr to the chip 500 (RC side) to notify the chip 500 that there is data to be read in the virtqueue.

Step S750: The RC side receives the data. The control circuit 520 obtains a received buffer in the virtqueue (i.e., dequeues the received buffer from the used ring buffer). The received buffer corresponds to the aforementioned transmission buffer.

Step S760: The control circuit 520 reads the data in the received buffer through the XADM 514 and the BAR window of the chip 400 (i.e., the control circuit 520 reads the EP-side data D_EP from the memory 430) and transmits the data to a data processing procedure.

Step S770: Memory deallocation. The control circuit 520 frees the received buffer by inserting it into the queue (i.e., queues the received buffer in the available ring buffer).

Step S780: The control circuit 520 writes data in the control block 435 on the EP side through the XADM 514 and the BAR window of the chip 400 to notify the EP side that there is an available buffer in the virtqueue.

Note that step S705 can be performed before or after steps S710 to S740 and can alternatively be performed simultaneously with steps S710 to S740, but step S705 is performed before steps S750 to S780.

It can be seen from FIGS. 4 to 7 that by arranging the shared memory on the EP side, the PCIe interface controller on the EP side can save at least one ATU (i.e., the ATU 215 in FIG. 2), which reduces cost and makes the product more competitive. In addition, as a result of the arrangement of the shared memory on the EP side, when an RC side is cascaded with multiple EP sides, the RC side does not need to provide a large amount of memory, which can reduce the cost on the RC side.

Figure 8:
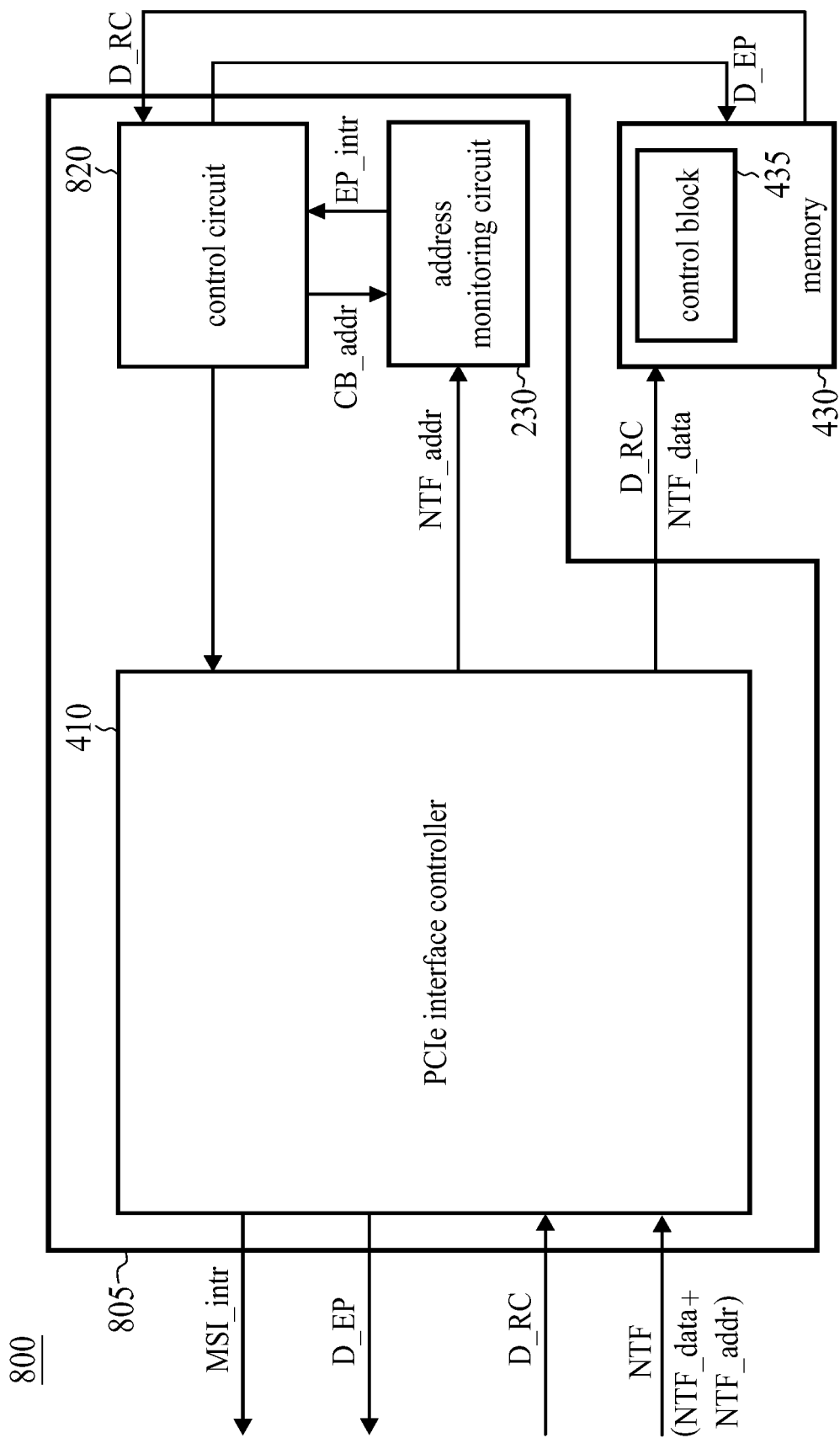
FIG. 8 shows a functional block diagram of a chip according to yet another embodiment of the present invention.

FIG. 8 shows the functional block diagram of a chip according to yet another embodiment of the present invention. The chip 800 includes a data transmission control device 805 and a memory 430. The data transmission control device 805 includes the PCIe interface controller 410, the control circuit 820, and the address monitoring circuit 230. In some embodiments (for illustrative purposes only, not for limiting the scope of the present invention), the chip 800 operates in the EP mode, provides the memory 430 as the shared memory, and determines whether the chip 800 has received the notification NTF by using the address monitoring circuit 230 to monitor whether data has been written into the control block 435. In other words, the chip 800 is a combination of the embodiment of FIG. 2 and the embodiment of FIG. 4; the details thereof are thus omitted herein for brevity. The chip 800 has the advantages of low cost (because at least one ATU is saved) and fast response (because of the use of the address monitoring circuit 230 to monitor the control block 435).

The control circuit 220, the control circuit 420, the control circuit 520, and the control circuit 820 can be circuits or electronic components with program execution capability, such as central processing units, microprocessors, microprocessor units, DSPs, application specific integrated circuits (ASICs), or their equivalent circuits. In some embodiments, the control circuit 220, the control circuit 420, the control circuit 520, and the control circuit 820 include direct memory access (DMA) circuits.

Although the embodiments discussed above take the Virtio as an example, this is not a limitation to the present invention. People having ordinary skill in the art can use other memory sharing methods to implement the communication between the RC side and the EP side.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A data transmission control device, disposed in a chip that comprises a Peripheral Component Interconnect Express (PCIe) interface and coupled to a memory that comprises a block, the data transmission control device comprising:
   a control circuit;
   a PCIe interface controller configured to receive a data; and
   an address monitoring circuit configured to issue an interrupt to the control circuit in response to the data being written into the block;
   wherein the address monitoring circuit issues the interrupt when the chip operates in an Endpoint (EP) mode;
   wherein the block is located at a predetermined address of the memory, and the data has a target address, the address monitoring circuit comprising:
      a comparison circuit configured to determine whether the predetermined address is identical to the target address; and
      an interrupt controller coupled to the comparison circuit and configured to generate the interrupt when the predetermined address is identical to the target address.

2. The data transmission control device of claim 1, wherein the PCIe interface controller comprises:
   an address translation unit (ATU);
   a register circuit configured to store an address range; and
   a receive application dependent module (RADM) configured to transmit the data to the ATU when the target address is within the address range;
   wherein the ATU translates the target address into an address of the memory.

3. The data transmission control device of claim 1, wherein the control circuit reads other data from the memory in response to the interrupt.

4. The data transmission control device of claim 1, wherein the data is a first data, before the PCIe interface controller receives the data, the chip has received, through the PCIe interface, a second data from a target chip operating in a Root Complex (RC) mode, and the control circuit reads the second data from the memory in response to the interrupt.

* * * * *